(12) United States Patent
Hirano

(10) Patent No.: US 7,740,301 B2
(45) Date of Patent: Jun. 22, 2010

(54) FUEL LID FOR A VEHICLE

(75) Inventor: Katsumi Hirano, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 583 days.

(21) Appl. No.: 11/726,271

(22) Filed: Mar. 21, 2007

(65) Prior Publication Data

US 2007/0227942 A1 Oct. 4, 2007

(30) Foreign Application Priority Data

Mar. 31, 2006 (JP) ............................. 2006-099653

(51) Int. Cl.
*B60J 9/00* (2006.01)
(52) U.S. Cl. .................................. 296/97.22
(58) Field of Classification Search .............. 296/97.22; 220/86.2, DIG. 33
See application file for complete search history.

(56) References Cited

U.S. PATENT DOCUMENTS 7,380,861 B2 * 6/2008 Engel ...................... 296/97.22

FOREIGN PATENT DOCUMENTS

| JP | 2004-175312 | 6/2004 |
|---|---|---|
| JP | 2005-075112 | 3/2005 |

* cited by examiner

*Primary Examiner*—Joseph D Pape
(74) *Attorney, Agent, or Firm*—Carrier, Blackman & Associates, P.C.; William D. Blackman; Joseph P. Carrier

(57) ABSTRACT

There is provided a fuel lid including a case that is fixed to a body open of a vehicle body for fueling and is connected with a fuel pipe; and a lid that is turnably attached to the case so as to open or close a case open formed on the case for fueling. The lid includes a lid base having a hinge by which the lid base is axially supported on the case; and a cover that covers an outer face of the lid base, and an engagement means including an engaging unit and an engaged unit is provided between the lid base and the cover, in which the lid base is provided with one of the engaging unit and the engaged unit and the cover is provided with the other unit, and through the engagement means, the lid base engages with the cover by a relative displacement therebetween.

5 Claims, 9 Drawing Sheets

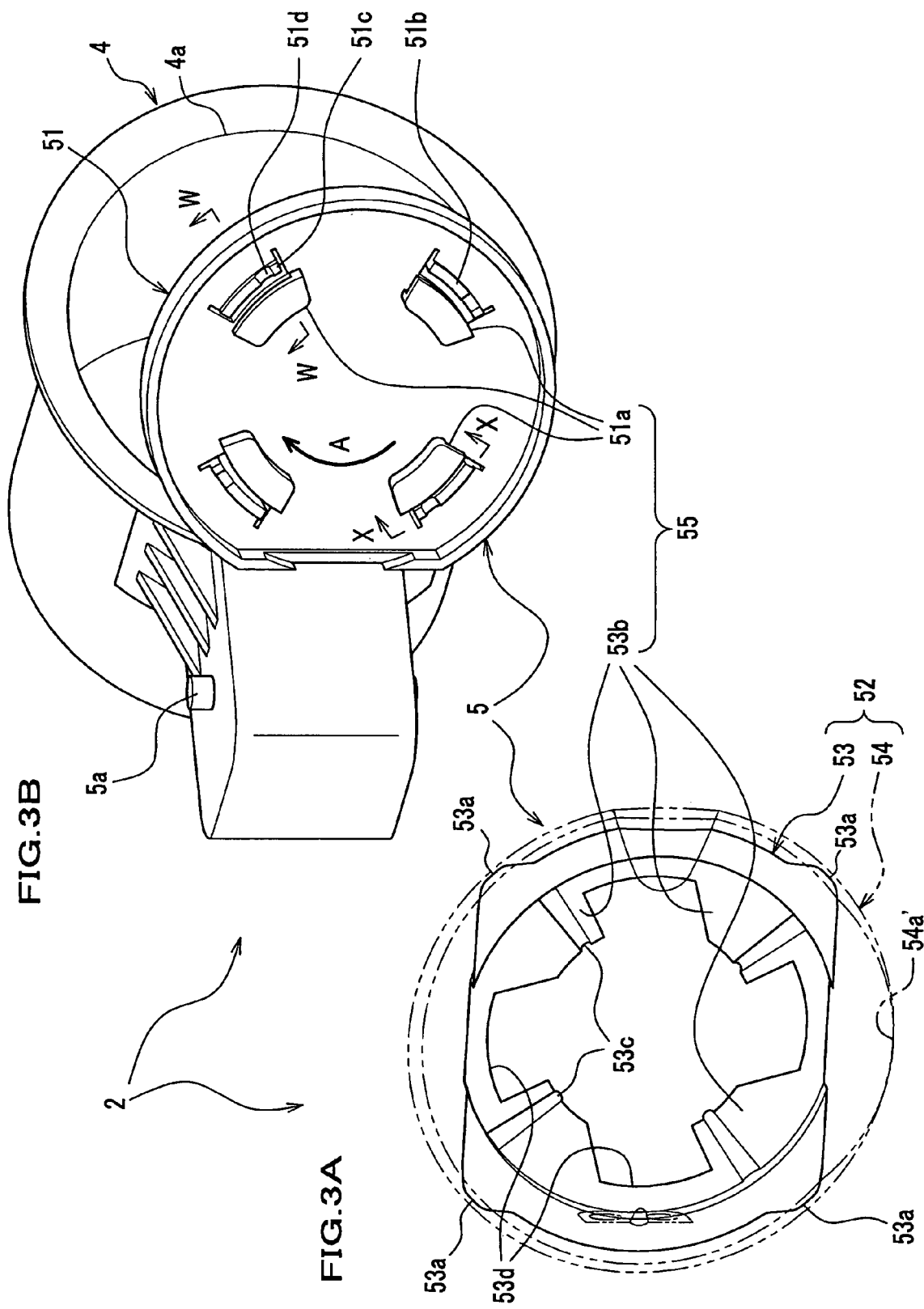

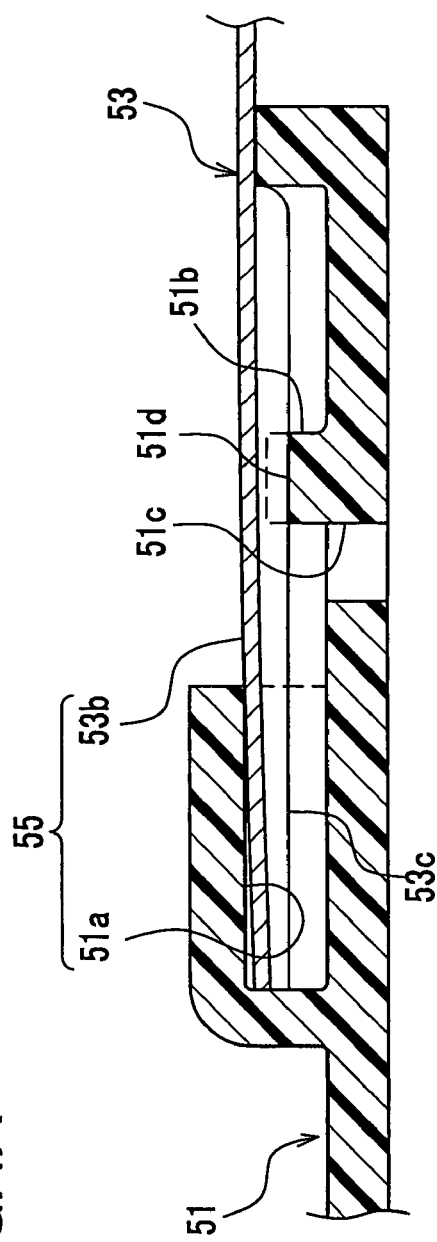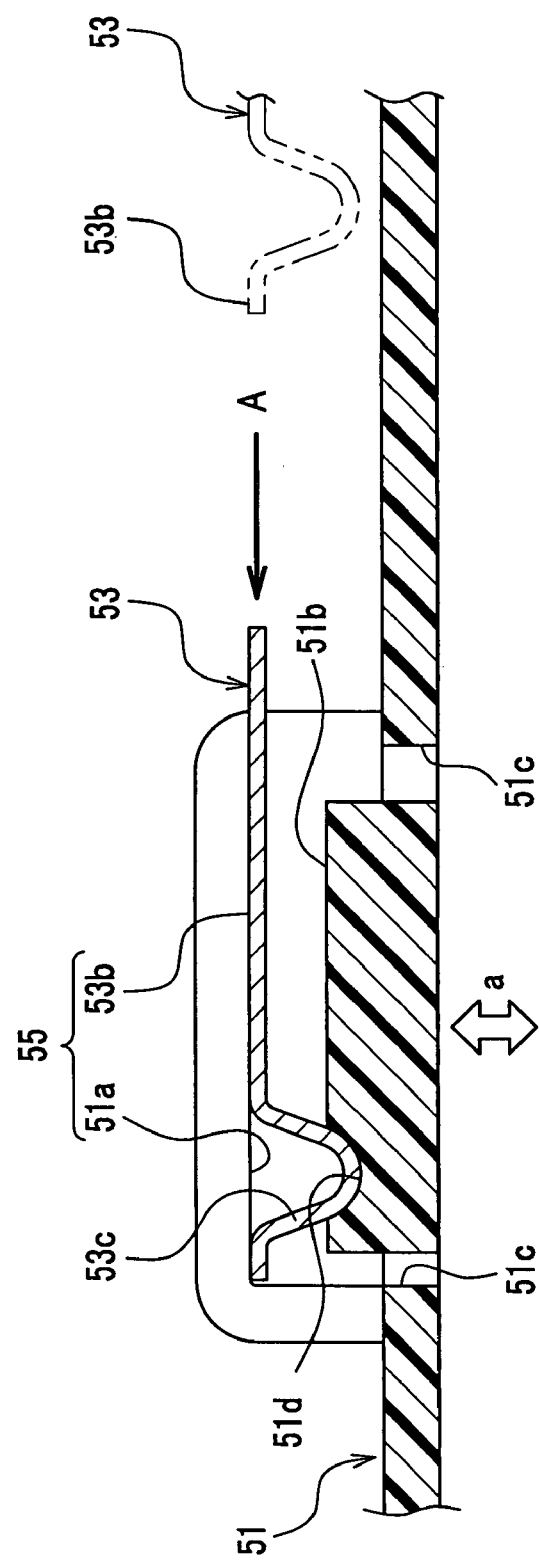

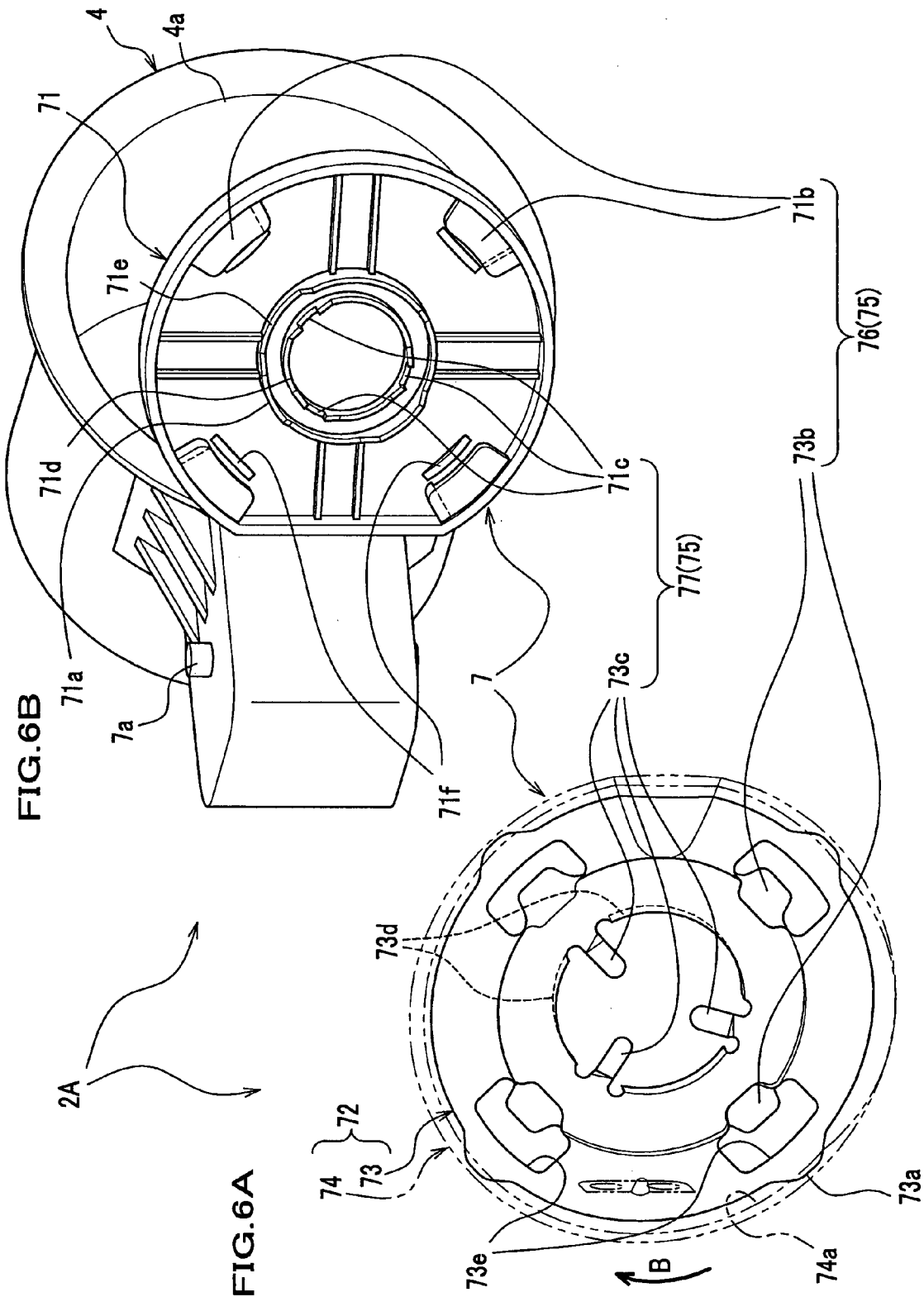

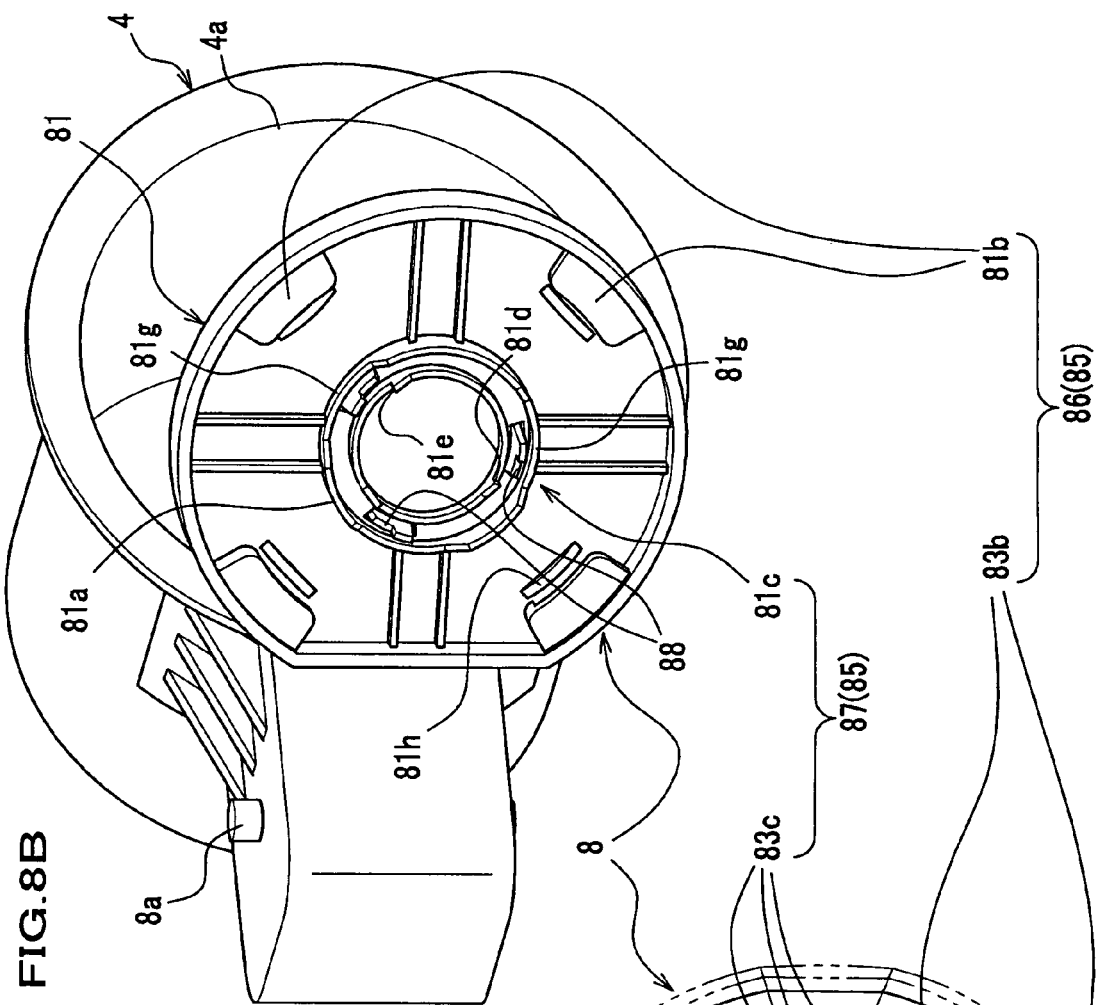
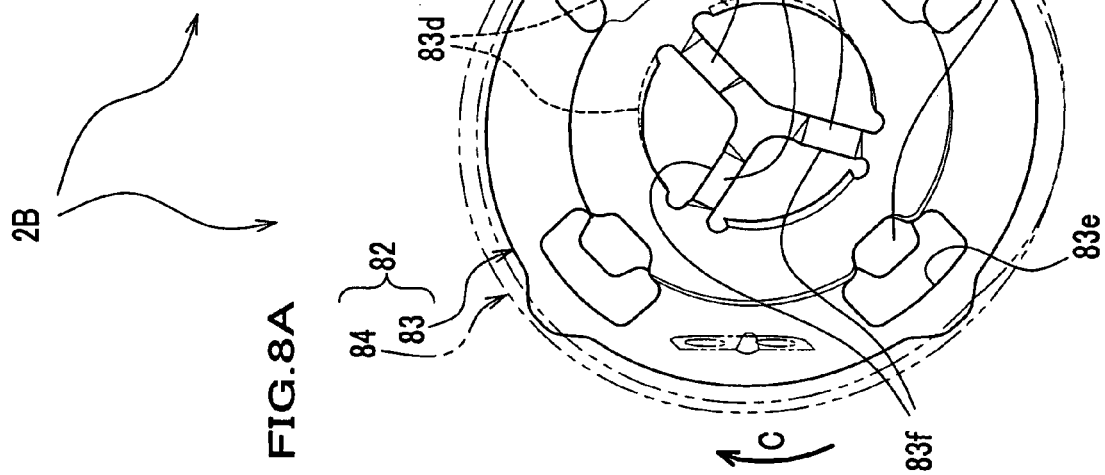

FUEL LID FOR A VEHICLE

CROSS-REFERENCE TO RELATED APPLICATION

This application claims the foreign priority benefit under 35 U.S.C. §119 of Japanese Patent Application No. 2006-099653 filed on Mar. 31, 2006, the disclosure of which is incorporated herein by reference.

BACKGROUND OF THE INVENTION

1. Field of the Invention

The present invention relates to a structure of a fuel lid that covers a fuel cap of a fuel port for fueling a vehicle and to a method of producing the fuel lid.

2. Description of the Related Art

For example, as disclosed in JP 2004-175312A, a vehicle is conventionally provided on a side panel outer thereof with a fuel filler case (hereinafter referred to as a "case") that is formed in an approximately C-letter shape in a side sectional view, in such a manner to surround a fuel port with a fuel cap thereon. The case has a case open, which is closed by a lid turnably hinge-supported on the case, so as to open and close the case open when fueling the vehicle. One end of the lid is turnably supported on the case via a hinge-stay in such a manner that an outer surface of the lid, when covering the case, appears the same as that of the side panel outer of the vehicle body. Conventionally, the lid and the case are assembled and then coated into a part by a parts manufacturer.

In a conventional structure of a fuel lid as disclosed in JP 2004-175312A, the lid jointed to the case is coated in a different process (at a parts manufacturer, for example) from a process of manufacturing a vehicle body. Therefore, there may cause a difference in coating color between the lid and the vehicle body. Consequently, appearance of the vehicle body may become ununiform, so that an additional process of checking the coating quality may be required.

In the light of the above difficulties, it would be desirable to provide a fuel lid having a structure realizing that a cover member of the lid is coated together with the side panel outer of the body with the same coating material in the same coating process.

SUMMARY OF THE INVENTION

In one aspect of the present invention, there is provided a fuel lid including a case that is fixed to a body open of a vehicle body for fueling and is connected with a fuel pipe; and a lid that is turnably attached to the case so as to open or close a case open formed on the case for fueling. The lid includes a lid base having a hinge by which the lid base is axially supported on the case; and a cover that covers an outer face of the lid base, and an engagement means including an engaging unit and an engaged unit is provided between the lid base and the cover, in which the lid base is provided with one of the engaging unit and the engaged unit and the cover is provided with the other unit, and through the engagement means, the lid base engages with the cover by a relative displacement therebetween.

In another aspect of the present invention, there is provided a method for producing a fuel lid including a case that is fixed to a body open of a vehicle body used for fueling and is connected with a fuel pipe; and a lid that is turnably attached to the case so as to open or close a case open formed on the case for fueling. The method includes providing a lid base axially supported on the case and a cover that covers an outer face of the lid base, thereby to constitute the lid; providing an engagement means between the lid base and the cover both of which constitute the lid, in which the engagement means includes an engaging unit and an engaged unit, and the lid base is provided with one of the engaging unit and the engaged unit, and the cover is provided with the other unit; coating the outer face of the cover with a same coating material in a same coating process of an outer panel of the vehicle body, and thereafter the coated cover is engaged with the lid base; and displacing the cover relative to the lid base, so as to engage the cover with the lid base through the engagement means between the cover and the lid base.

Other features and advantages of the present invention will become more apparent from the following detailed description of the invention when taken in conjunction with the accompanying exemplary drawings.

BRIEF DESCRIPTION OF THE DRAWINGS

FIGS. 3A and 3B are exploded perspective views showing the structure of the fuel lid according to the first embodiment of the present invention.

FIGS. 4A and 4B are drawings each showing a state in which engaging portions engages with the engaged pieces. FIG. 4A is an enlarged sectional view on arrows "W-W" of FIG. 3B; and FIG. 4B is an enlarged sectional view on arrows "X-X" of FIG. 3B, respectively.

FIG. 5A is a perspective view of essential parts showing a state in which each notch of the cover is loosely fitted relative to the corresponding engaging portion of the lid base; and Fig; and 5B is a perspective view of essential parts showing a state in which each engaged piece of the cover is engaged with the corresponding engaging portion of the lid base.

FIGS. 6A and 6B are exploded perspective views of a structure of a fuel lid according to a second embodiment of the present invention.

FIG. 7A is a perspective view of essential parts showing a state in which each of first engaged pieces and second engaged pieces of the cover are placed between a corresponding first engaging portion and second engaging portion of a lid base, respectively; and FIG. 7B is a perspective view of essential parts showing a state in which the first engaged piece and the second engaged piece of the cover are engaged with the first engaging portion and the second engaging portion of the lid base, respectively.

FIG. 8 is an exploded perspective view of a variation of the structure of the fuel lid according to the embodiment of the present invention.

DETAILED DESCRIPTION OF THE PREFERRED EMBODIMENTS

First Embodiment

Figure 1:
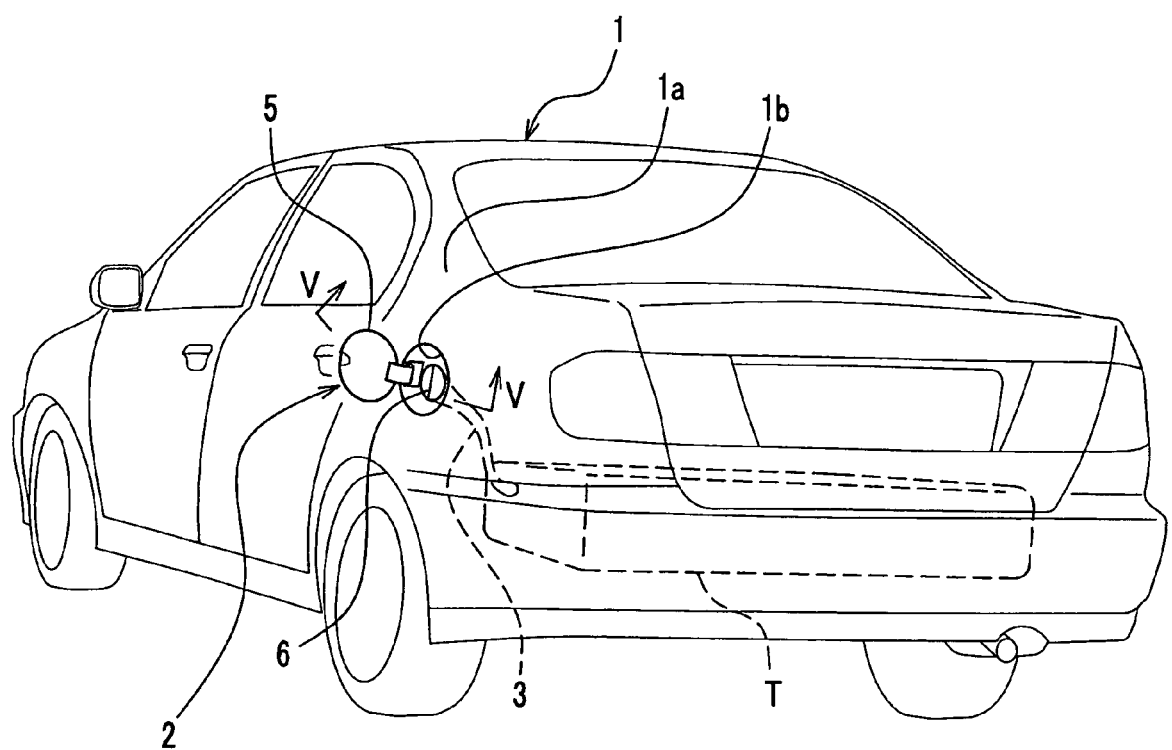
FIG. 1 is a perspective view of a vehicle provided with a fuel lid according to a first embodiment of the present invention.
Figure 2:
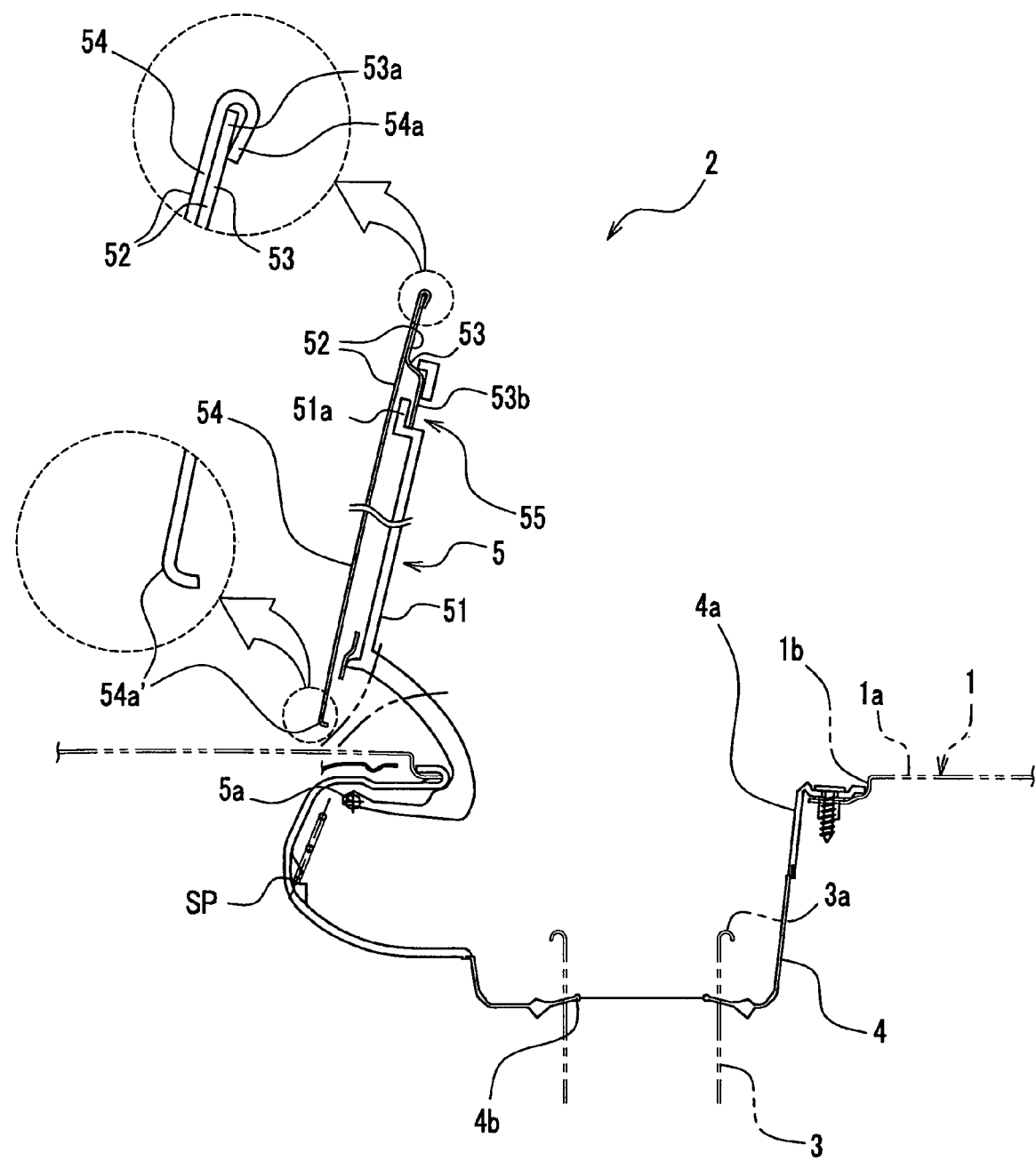
FIG. 2 is an enlarged cross sectional view of a structure of the fuel lid according to the first embodiment taken along the direction of the arrows "V, V" in FIG. 1, showing a state of a lid of the fuel lid in a vertical direction.

With reference to FIGS. 1 to 3, descriptions will be provided on a structure of a fuel lid according to a first embodiment of the present invention.

FIG. 1 is a perspective view of a vehicle provided with the structure of the fuel lid 2 according to the first embodiment of the present invention.

FIG. 2 is an enlarged cross sectional view of the structure of the fuel lid 2 according to the first embodiment taken along the direction of the arrows "V, V" in FIG. 1, showing a state of the lid 5 in a vertical direction.

<Structure of Fuel Lid>

As shown in FIG. 1, the fuel lid 2 is provided on an outer side panel 1a of a vehicle body 1, which opens or closes an opening made on the periphery of a fuel port 3a for fueling a fuel tank T (see FIG. 2). As shown in FIG. 2, the fuel lid 2 includes a case 4 that is fixed at an open end 1b of the vehicle body 1 for fueling the vehicle body 1, and a lid 5 that is turnably supported on the case 4 so as to open or cover a case opening 4a made on the case 4 for fueling the fuel tank T.

(Structure of Fuel Pipe)

As shown in FIG. 2, the fuel pipe 3 has a fuel port 3a on which a fuel cap 6 (see FIG. 1) is attached at one end thereof, and is connected to the fuel tank T at the other end thereof (see FIG. 1). The fuel port 3a of the fuel pipe 3 is provided within the case 4 that is formed in an approximately C-letter shape in a side sectional view.

(Structure of Case)

The case 4 is formed of a material such as synthetic resin into an approximately cylinder shape, and is provided between the open end 1b of the vehicle body 1 and the periphery of the fuel pipe 3, so that the open end 1b and the fuel pipe 3 are connected. The case opening 4a, which is at one end of the case 4, is fixed around the open end 1b that is formed slightly set back from a surface level of the side panel outer 1a of the vehicle 1. A case opening 4b, which is at the other end of the case on the pipe side, is connected to the fuel pipe 3. Within the case 4, the fuel cap 6 is provided, which plugs the fuel port 3a of the fuel pipe 3 (FIG. 1). The lid 5 is turnably supported by a hinge 5a, and the lid 5 opens and covers the case opening 4a by moving the lid 5 in both directions represented by an arrow of FIG. 2.

As shown in FIG. 2, the lid 5 is a cover member to cover the open end 1b of the vehicle body 1 and the case opening 4a, The lid 5 includes a lid base 51 axially supported on the case 4 via the hinge 5a, and a cover 52 that is provided so as to cover a surface of the lid base 51. The lid 5 is attached to the case 4 such that one end of the lid base 51 is turnably attached to the case 4 via the hinge 5a. The lid 5 is provided in such a manner that an outer face 54 of the cover 52, when covering the case opening 4a, appears the same as that of the side panel outer 1a of the vehicle body 1.

The lid base 51 has engaging portions 51a (also referred to as "engaging unit") and the cover 52 has engaged pieces 53b (also referred to as "engaged unit"). The engaging portions 51a of the lid base 51 and the engaged pieces 53b of the cover 52 constitute an engagement means 55 of the lid 5, which engages the lid base 51 and the cover 52 by displacing the cover 52 relative to the lid base 51.

A spring SP is provided between the hinge 5a and the case 4 so as to make the lid 5 jump up in a releasing direction thereof.

(Structure of Lid Base)

The lid base 51 is a base member of the lid 5, and is integrally formed together with the hinge 5a for axially supporting the lid base 51 to the case 4, and with the engaging portions 51a for holding the cover 52. The lid base 51 may be formed of synthetic resin, for example.

FIG. 3 is an exploded perspective view showing the structure of the fuel lid 2 according to the first embodiment of the present invention.

(Structure of Cover)

As shown in FIG. 3A, the cover 52 is a cover member to cover the open end 1b of the vehicle body 1 (see FIG. 2), and may be formed of a metal plate material, for example. The cover 52 includes a body 53 that is attached to the lid base 51, and an outer face 54 that is provided on an outer side of the body 53 (on the same side of the outer surface of the outer side panel 1a of the vehicle body 1). The cover 52 is coated together with the side panel outer 1a of the vehicle 1 in the same color with the same coating material in the same coating process.

The body 53 is a base member of the cover 52, and may be formed by pressing a relative thin metal plate material. The body 53 is made of an approximately circular shaped material, and projecting flanges 53a are formed (four flanges in his embodiment, for example) on part of the outer circumferential edge of the cover body 53. There are provided engaged pieces 53b (four flanges in his embodiment, for example) on the inner circumference of a face of the body 53 opposing the cover 52.

The outer face 54 is a plate member for constituting an outer surface of the fuel lid 2, and may be made of a thin metal plate in an approximately circular shape, for example. There are formed a hem 54a on the circumferential edge of the outer face 54, which is folded over the flanges 53a so that the outer face 54 of the cover member 52 is fixed to the body 53 (see FIG. 2).

The hem 54a' at a lower potion of the cover 52 is formed to open relative to the cover 53, as shown in FIG. 2, whereby preventing water from being pooled in the hem 54a' when it rains or the vehicle body 1 is washed (see FIG. 2).

(Structure of Engagement Means)

As shown in 3A and 3B, the engagement means 55 is respectively formed on each face of the lid base 51 and the cover 52 opposing each other along the circumferential direction thereof, and the cover 52 is displaced relative to the lid base 51, by slidingly turning the cover 52 against the lid base 51, so that the lid base 51 and the cover 52 are engaged with each other through the engagement means 55. The engagement means 55 includes engaged pieces 53b that are formed on the body 53 of the cover 52 (four engaged pieces in the this embodiment, for example, see FIG. 3A) and the engaging portions 51a that are formed on the lid base 51 (FIG. 3A), so that the engaged pieces 53b and the engaging portions 51a are engaged with each other.

As shown in FIG. 3A, the engaged pieces 53b of the cover 52 are projecting pieces (four pieces in this embodiment, for example) serving for holding the cover 52 to the lid base 51 in FIG. 3B through the engagement. These engaged pieces 53b are formed such that they project from the inner circumference of the body 53 toward the center of the cover 52. On each engaged piece 53b, a projection 53c is formed and longitudinally oriented toward the center of the cover 52 so that each projection 53c presses an inner wall face of the corresponding engaging portion 51a which is formed in an approx. L-letter shape in a cross sectional view when the engaged piece 53c is engaged with the engaging portion 51a. A notch 53d is formed between each engaged piece 53b of the body 53. The notch 53d serves as a free space for tentatively accepting the engaging portion 51a projecting from the disk face of lid base 51 when the body 53 is engaged with the lid base 51 of FIG. 3B.

Each projection 53c of the cover 52 is constituted by a groove press-formed in a semi-circular arc shape in a cross sectional view, which extends between a base end and a tip end of the engaged piece 53b, and is longitudinally oriented toward the center of the cover 52. Each projection 53c is formed such that it serves for pressing the engaged piece 53b against the inner wall face of the engaging portion 51a of the lid base 51 so as to prevent the engaged piece 53b from coming off the engaging portion 51a of the lid base 51, for securing the cover 52 to be fixed to the lid base 51 without shaking when the engaged piece 53b is engaged with the corresponding engaging portion 51a, and for enhancing strength of the engaged piece 53b itself.

As shown in FIG. 3B, the engaging portions 51a are projectedly formed on a face of the lid base 51 opposing a face of the cover 52 on which the engaged pieces 53b of the body 53 of the cover 52 are formed as shown in FIG. 3A, in such a manner that each engaging portion 51a is formed at a position corresponding to the engaged piece 53b so that each engaging portion 51a is engaged with the corresponding engaged piece 53b, whereby the lid base 51 engages with the cover 52.

FIGS. 4A and 4B are drawings each showing a state in which the engaging portions 51a engage with the engaged pieces 53b. FIG. 4A is an enlarged sectional view on arrows "W-W" of FIG. 3B, and FIG. 4B is an enlarged sectional view on arrows "X-X" of FIG. 3B, respectively.

As shown in FIG. 4A, the engaging portion 51a of the lid base 51 has an L-letter shaped cross section viewed from the direction of engaging the cover 52 with the lid base 51 (the direction defied by the arrow "A" of the FIG. 3B), and also has an L-letter shaped cross section viewed in the direction from the circumference to the center (i.e. the radial direction) of lid base 51, thereby to constitute a semi-box shape. In other words, the engaging portions 51a are formed such that each portion 51a engages with the corresponding engaged piece 53b by fitting the body 53 of the cover 52 onto the disk face of the lid base 51, and slidingly turning the cover 52 against the lid base 51 in the clockwise direction defined by the arrow "A" of FIG. 3B.

As shown in FIG. 3B, a slit 51c and an elastic piece 51b are formed in the vicinity of each engaging portion 51a on the outer circumferential side of the lid base 51. The slit 51c is formed in a C-letter shape in such a manner as to surround the elastic piece 51b of the lid base. Since the slit 51c is provided around the elastic piece 51b, the elastic piece 51b takes on an elastic property like a plate-spring flexible in a vertical direction defined by an arrow "a" as shown in FIG. 4B. At an end of each elastic piece 51b, there is provided a locking groove 51d so as to lock the projection 53c.

As shown in FIGS. 4A and 4B, the locking groove 51d serves for elastically holding the engaged piece 53b that is slidedly engaged with the engaging portion 51a when the body 53 of the cover 52 is fixed to the lid base 51, so as to present the body 53 of the cover 52 from coming off the lid base 51.

<Operation of First Embodiment>

There will be provided descriptions on an operation of the structure of the fuel lid 2 according to the first embodiment of the present invention, with reference to FIGS. 2 to 5.

The body 53 and the outer face 54 of the cover 52 shown in FIG. 2 and FIG. 3A are manufactured into a different member by pressing metal plate material, respectively. As shown in FIG. 2, the cover 52 is formed in such a manner that the hem 54a' of the outer face 54 is folded to cover the flanges 53a formed on part of the circumferential edge of the body 53, whereby the outer face 54 and the body 53 are integrated into the cover 52 as a single member. The lid base 51 may be made of synthetic resin material by using injection molding techniques.

Accordingly, the outer face 54 serving as an outer surface of the fuel lid 2 is reinforced with the body 53, and then is formed into the cover 52, which is a different member from the lid base 51.

The cover 52 formed in this way is coated with the same coating material in the same coating process together with the outer side panel 1a of the vehicle body 1. As described above, since the outer face 54 of the fuel lid 2 and the outer side panel 1a of the vehicle body 1 are coated in an identical color, in is possible to solve difficulties cased by differences in coating color or non-uniformity of coating, resulting in enhancement in appearance.

It should be noted that, before fixing the outer face 54 to body 53, only the outer face54 may be coated in the coating process together with the outer side panel 1a of the vehicle body 1, and then the coated outer face 54 is fixed to the body 53 in the above described manner.

Since the lid base 51 formed of synthetic resin material is manufactured as a separate member from the cover 52, it is possible to roughly uniform a thickness of the lid base 51 by omitting a thickness of the cover 52, thereby to prevent dents cased in an injection molding process.

Figure 5A:
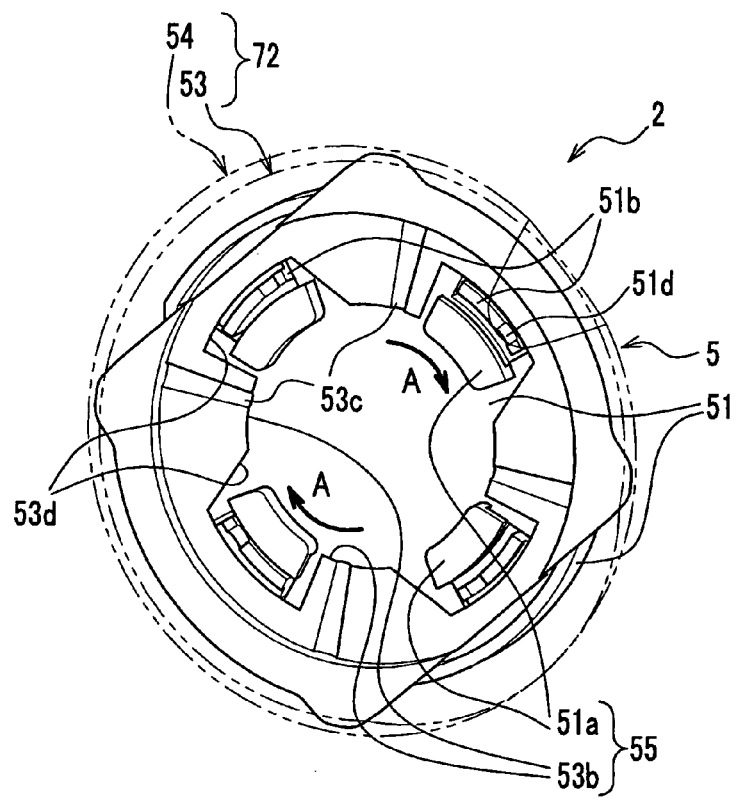
FIGS. 5A and 5B are drawings showing the structure of the fuel lid according to the first embodiment of the present invention.
Figure 5B:
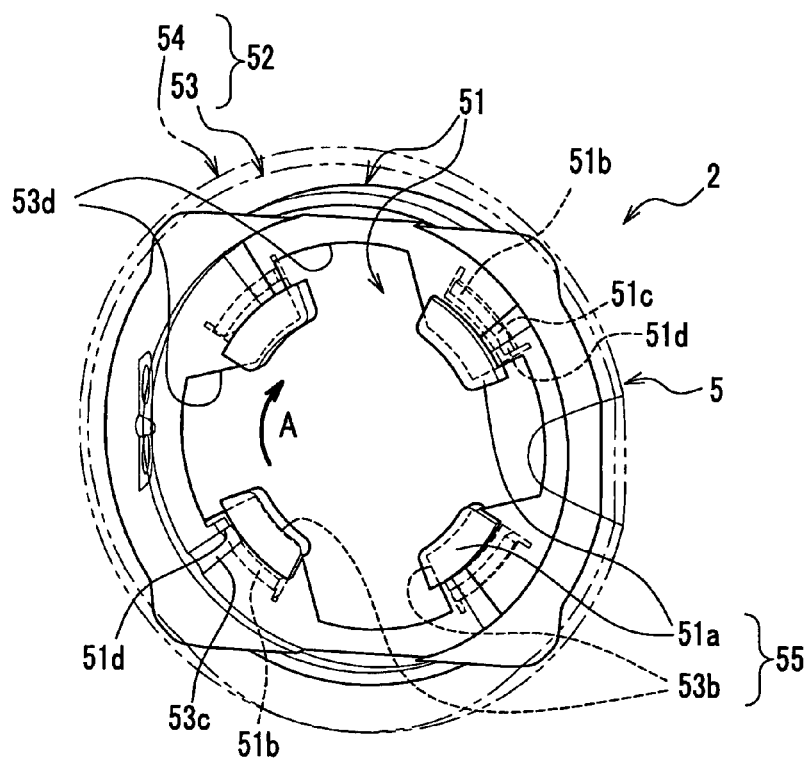

FIG. 5 is a drawing showing the structure of the fuel lid 2 according to the first embodiment of the present invention. FIG. 5A is a perspective view of essential parts showing a state in which each notch 53d of the cover 52 is loosely fitted relative to the corresponding engaging portion 51a of the lid base 5; and FIG. 5B is a perspective view of essential parts showing a state in which each engaged piece 53b of the cover 52 is engaged with the corresponding engaging portion 51a of the lid base 5.

The cover 52 which is a different member from the lid base 51, as shown in FIG. 3A, is coated and dried, and thereafter is engaged with the lid base 51 through the engagement means 55 so as not to come thereoff.

In order for establishing the engagement between the cover 52 and the lid base 51, each engaging portion 51a of the lid base 51 is loosely fitted in the corresponding notch 53d of the cover 52, and then the cover 52 is slidedly turned (displaced) relative to the lid base 51 in the clockwise direction defined by the arrow "A" of FIGS. 5A and 5B.

Therefore, as shown in FIG. 5B, each engaged piece 53b of the cover 52 is slipped into the corresponding engaging portion 51a of the lid base 51 so as to be engaged with each other. At this time, the projection 53c formed on each engaged piece 53b moves along the direction of the arrow "A" on the disk face of the lid base 51 as shown in FIG. 4B, while pushing the elastic piece 51b downward (see FIGS. 4), into the engaging portion 51a, and then is press-fitted and locked in the locking groove 51d of the corresponding elastic piece 51b. Accordingly, each projection 53b is press-fitted and locked into the locking groove 51d, thereby to ensure a firm engagement between each engaged piece 53b and the corresponding engaging portion 51a.

In the fuel lid 2 according to this embodiment of the present invention, even after the cover 52 is coated, the lid 5 can be assembled in a stable state simply by displacing the cover 52 relative to the lid base 51.

The above assembled lid 5 is axially supported via the hinge 5a to the case 4 as shown in FIG. 2, so that the lid 5 is turnably supported on the case 4 to open or close the case open 4a of the case 4. Then, the fuel lid 2 is attached to the vehicle body 1 by screwing the case 4 to the open end 1b of the vehicle body 1.

As shown in FIG. 2, the fuel lid 2 that is attached to the vehicle body 1 in such a manner that the hem 54a' of the outer face 54 is folded toward the back of the cover 52 so as to cover the flange 51b of the body 53, whereby preventing water from being pooled in the hem 54a when it rains or the vehicle body 1 is washed (see FIG. 2). Accordingly, it is possible to present the fuel lid 2 from pooled water in the hem 54a' so as not to get rust at the lower part of the cover 52 thereof.

Second Embodiment

There will be provided descriptions on the second embodiment of the present invention, with reference to FIGS. 6 and 7.

It should be noted that descriptions will be omitted on those components having the same function as in the structure of the fuel lid 2 according to the first embodiment of the present invention with reference to FIGS. 1 to 5.

Figure 7A:
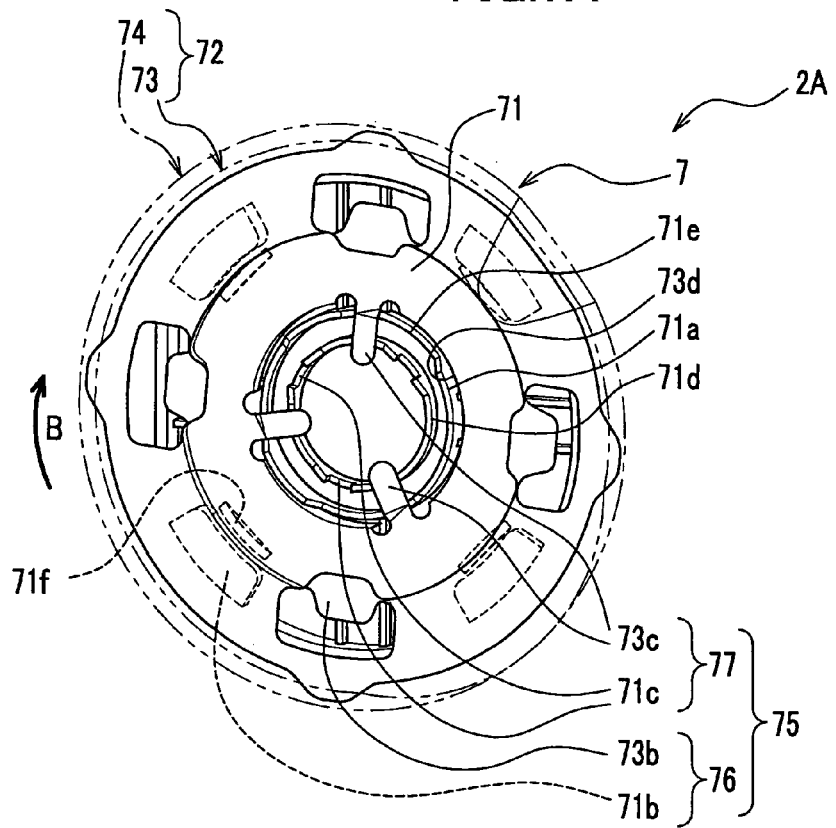
FIGS. 7A and 7B are drawings showing the structure of the fuel lid according to the second embodiment of the present invention.
Figure 7B:
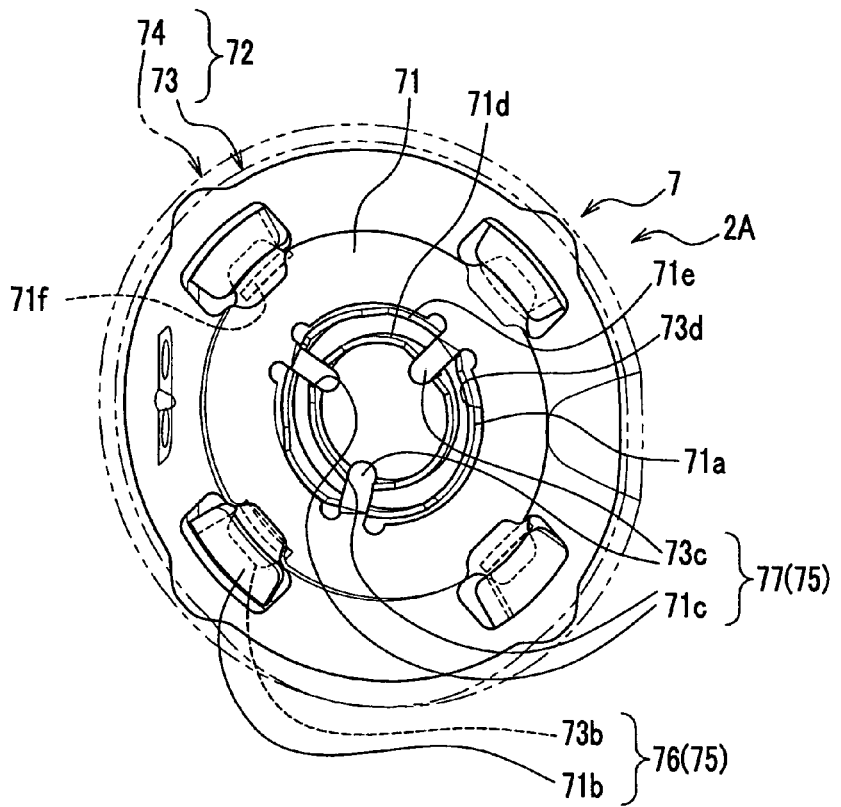

FIGS. 6A and 6B are exploded perspective views of a structure of a fuel lid 2A according to the second embodiment of the present invention. FIGS. 7A and 7B are drawings showing the structure of the fuel lid according to the second embodiment of the present invention. FIG. 7A is a perspective view of essential parts showing a state in which each of first engaged pieces 73b (also referred to as a "first engaged unit") and second engaged pieces 73c (also referred to as a "second engaged unit") of a cover 72 are set between a corresponding first engaging portion 71b (also referred to as "first engaging unit") and second engaging portion 71c (also referred to as "second engaging unit") of a lid base, respectively; and FIG. 7B is a perspective view of essential parts showing a state in which the first engaged piece 73b and the second engaged piece 73c of the cover 72 are engaged with the first engaging portion 71b and the second engaging portion 71c of the lid base 71, respectively.

In the structure of the fuel lid 2A according to the second embodiment of the present invention, there is provided an engagement means 75 of the fuel lid 2A (corresponding to the engagement means 55 of the fuel lid 2 in the first embodiment) that is constituted of a first engagement means 76 and a second engagement means 77 as shown in FIGS. 6A and 6B, respectively. The first engagement means 76 including the first engaging portions 71b and the first engaged pieces 73b is provided on each opposing face of a lid base 71 and a cover 72 of a lid 7 on the inner circumferential side thereof, respectively, and the second engagement means 77 including the first engaging portions 71b and the first engaged pieces 73b is provided on the outer circumferential side of the first engagement means 76 provided on the lid base 71 and the cover 72. There are also provided first ribs 71a projecting toward the cover 72 on the lid base 71, and there are provided second ribs 73d projecting toward the lid base 71 on the cover 72. Those components of the ribs are different from the structure of the fuel lid 2 in the first embodiment of the present invention, and mainly characterizes the structure of the fuel lid 2A of the second embodiment.

Detailed descriptions will be provided on the structure of the fuel lid 2A of the second embodiment, with reference to FIGS. 7A and 7B.

<Structure of Lid>

As shown in FIG. 6B, the lid 7 includes a lid base 71 that is axially supported on the case 4 via a hinge 7a and a cover 72 that covers a surface of the lid base 71, as similar to the first embodiment. The lid 7 is designed in such a manner that an outer face 74 attached to a body 73 of the cover 72, when covering the case open 4a, appears the same as that of the outer side panel 1a of the vehicle body 1 (see FIG. 2).

The lid base 71 and the cover 72 is integrated by engaging the first engagement means 76 with the second engagement means 77, both of which are provided on the lid base 71 and the cover 72, so as to constitute the lid 7.

(Structure of Lid Base)

The lid base 71 of FIG. 6B is integrally formed with the hinge 7a, first engaging portions 71b, second engaging portions 71c and the first ribs 71a. Each first engaging portion 71b (also referred to as a "first engaging unit") is engaged with a corresponding first engaged piece 73b (also referred to as a "first engaged unit") provided on the outer circumference of the body 73 of the cover 72 of FIG. 6A. Each second engaging portion 71c is engaged with a corresponding second engaged piece 73c provided on the inner circumferential side of the body 73 of the cover 72 of FIG. 6A. In addition, on the lid base 71, an annular projection member 71d is concentrically provided on the inner side of the first rib 71a, on which restriction grooves 71e are formed.

The first rib 71a is an annular member having projections that serves for engaging with a second rib 73d provided on the inner circumferential edge of the body 73 of the cover 72 when the body 73 of the cover 72 is fixed to the lid base 71, as shown in FIG. 7B. The notched restriction grooves 71e are formed on an upper end face of the first rib 71a. For example, three of second engaged pieces 73c are formed on the body 73 of the cover 72, each of which is loosely accepted by the corresponding notched restriction groove 71e of the lid base 71. Each of those second engaged pieces 73c that are oriented to the center of the cover 72 is respectively placed within the corresponding restriction groove 71e that is formed on the first rib 71a and extends toward of the cover 72. When the body 73 of the cover 72 is fixed to the lid base 71, each restriction groove 71e contacts and accepts the corresponding second engaged piece 73c at the base portion thereof.

The annular projection member 71d is provided on the inner circumference side of the first rib 71a of the lid base 71 with a shorter distance from the first ribs 71a than the projection length of the second engaged piece 73c. On an end face of the annular projection member 71d, there are provided second engaging portions 71c serving for engaging with respective second engaged pieces 73c of the body 73 of the cover 72 accepted within the corresponding restriction groove 71e. As shown in FIG. 6B, the second engaging portion 71c is constituted of a C-letter shaped groove in a cross-sectional view.

(Structure of Cover)

The cover 72 is a member that is coated with the same coating material in the same coating process of the outer side panel 1a of the vehicle body 1 (see FIGS. 1 and 2), similar to the first embodiment of the present invention. The cover 72 includes the body 73 that is fixed to the lid base 71 and the outer face 74 that is attached to the body 73 on the outer side.

The body 73 includes flanges 73*a* that are formed on part of the outer circumferential edge thereof and are fixed to the cover 72 by a hem 74*a* of the outer face 74 of the cover 72; first engaged pieces 73*b* that are formed on an inner circumferential side of the flanges and are engaged with the first engaging portions 71*b*; and the second engaged pieces 73*c* that are engaged with the second engaging portions 71*c* and are formed on the innermost circumferential side of the body 73.

(Structure of First Engagement Means)

As shown in FIGS. 6A and 6B, the first engagement means 76 is constituted by the first engaged pieces 73*b* and the first engaging portions 71*b* that engage with each other. The first engaged pieces 73*b* are formed along the outer circumference of the body 73 of the cover 72. The first engaging portions 71*b* engage with the first engaged pieces 73*b* formed on the lid base 71 when the cover 72 is slidedly turned (displaced) relative to the lid base 71 in the arrow "B" direction of FIG. 6A.

There is provided a punched hole 73*e* on the outer circumferential side of each first engaged piece 73*b* of the cover 72. These punched holes 73*e* are produced when the first engaged pieces 73*b* are press-formed. Since each first engaged piece 73*b* is punched in such a manner that a tip end of the first engaged piece 73*b* at the inner circumferential edge of the punched hole 73*e* rises toward the lid base 71 side, when fixing the body 73 onto the lid base 71, the first engaged piece 73*b* is engaged with the engaging portion 71*b* with the base end of the first engaged piece 73*b* pressed by a pressing projection 71*f* provided on the lid base 71 (described later, see FIG. 6B), whereby the tip end of the first engaged piece 73*b* is firmly pressed against an inner wall of the first engaging portion 71*b*.

Each first engaging portion 71*b* is constituted of a semi-box like projection where the first engaged piece 73*b* is accepted when the cover 72 is displaced relative to the lid base 71 to assemble the lid base 71 and the cover 72. The first engaging portion 71*b* has an open on a side where the first engaged piece 73*b* enters and another open on a side facing the center of the lid base 71.

In the vicinity of each first engaging portion 71*b*, the pressing projection 71*f* is integrally formed on the disk face of the lid base 71, which has a semi-arc shape in a cross sectional view and serves for pressing the first engaged piece 73*b* of the cover 72 when fixing the cover 72 onto the lid base 71.

(Structure of Second Engagement Means)

The second engagement means 77 is formed along the circumference of the lid base 71 and the cover 72 respectively, in such a manner that second engaging portions 71*c* of the lid base 71 and second engaged pieces 73*c* of the cover 72 are engaged with each other when slidingly tuning the cover 72 against the lid base 71 to displace the cover 72 relative to the lid base 71.

The second engaging portions 71*c* are formed on an end face of the annular projection member 71*d* that is concentrically provided around a center of the lid base 71, and each is constituted of a C-letter shaped groove with which the corresponding second engaged piece 73*c* are engaged. There are provided slope faces on the left and right sides of each second engaging portion 71*c* in the turning direction. There is provided on the upper end face of each first rib 71*a* the restriction groove 71*e* in a C-letter shape having a wider width than that of the second engaging portion 71*c*. The restriction groove 71*e* serves for restricting turning movement of the second engaged piece 73*c* when the second engaged piece 73*c* is engaged and a side face of the base end thereof contacts the first rib 71*a* (see "Structure of Lid Base").

As shown in FIG. 6A, the second engaged pieces 73*c* are projections that serve for being engaged with the lid base 71 so as to be fixed to the lid base 71. The second engaged pieces 73*c* are constituted of three projections projecting from the inner circumferential edge of the body 73 toward the center thereof. The projection of each second engaged piece 73*c* has a tilt that rises toward the turning direction defined by the arrow "B" of FIG. 6B, so that the second engaged piece 73*c* easily passes over the slope face provided next to the second engaging portion 71*c* when the body 73 of the cover 72 is slidedly turned in the tuning direction of the arrow "B" so as to fix the cover 72 to the lid base 71.

<Operation of Second Embodiment>

Descriptions will be provided on the operation of the structure of the fuel lid according to the second embodiment of the present invention.

Similarly to the first embodiment, the cover 72 of the second embodiment in FIG. 6A is integrated to the body 73 in such a manner that the hem 74*a* of the outer face 74 of the cover 72 are folded over the flanges 73*a* formed on part of the outer circumferential edge of the body 73, so as to cover the corresponding flange 73*a*, whereby the body 73 is held by the outer face 74 of the cover 72 that is larger than the body 73. The cover 72 assembled in this way is coated with the same coating material in the same coating process together with the side panel outer 1*a* of the vehicle body 1 (see FIGS. 1 and 2), thereby to prevent differences in coating color or non-uniformity of coating.

It should be noted that, before fixing the outer face 74 to body 73, only the outer face 74 may be coated in the coating process together with the outer side panel 1*a* of the vehicle body 1, and then the coated outer face 74 is fixed to the body 73 in the above described manner.

As shown in FIG. 7A, the finished cover 72 is set on the lid base 71 such that each first engaged piece 73*b* of the body 73 is set between each first engaging portion 71*b* of the lid base 71, and each second engaging piece 73*c* of the body 73 is set on the corresponding restriction groove 71*e* of the lid base 71, and the second rib 73*d* is loosely engaged with the first rib 71*a*. Then, the body 73 of the cover 72 is slidedly turned (displaced) in the clockwise direction relative to the lid base 71.

Accordingly, as shown in FIG. 7B, each first engaged piece 73*b* is engaged with the corresponding first engaging portion 71*b* in such a manner that the base end of the first engaged piece 73*b* runs up to the pressing projection 71*f* of the first engaging portion 71*b* so as to be firmly pressed by the pressing projection 71*f*. At the same time, the tip end of the first engaged piece 73*b* slides into the semi-box shaped portion of the first engaging portion 71*b*, and is firmly pressed against the inner wall of the first engaging portion 71*b*.

On the other hand, each second engaged pieces 73*c* is engaged with the corresponding second engaging portion 71*c* in such a manner that the base end of the second engaged piece 73*c* contacts the side wall of the restrict groove 71*e*. At the same time, the tip end of the second engaged piece 73*c* fits into the second engaging portion 71*c* of a C-letter shaped groove so as to be engaged therewith.

In addition, the second rib 73*d* formed on the inner circumferential edge of the cover 72 is engaged with the first rib 71*a* at the outer circumferential wall of the first rib 71*a*, so that the first rib 71*a* and the second rib 73*d* contacts each other.

As described above, the body 73 of the cover 72 is firmly fixed to the lid base 71 through the first engagement means 76 and the second engagement means 77. Accordingly, it is possible to assemble three separate members that are the lid base 71, the body 73 and the outer face 74 into the lid 7 as a single integrated part without getting disassembled into members.

The present invention is not limited to the first and second embodiments, and can be changed or modified into variations within the scope of the invention as set forth in the claims.

Variation

Figure 9:
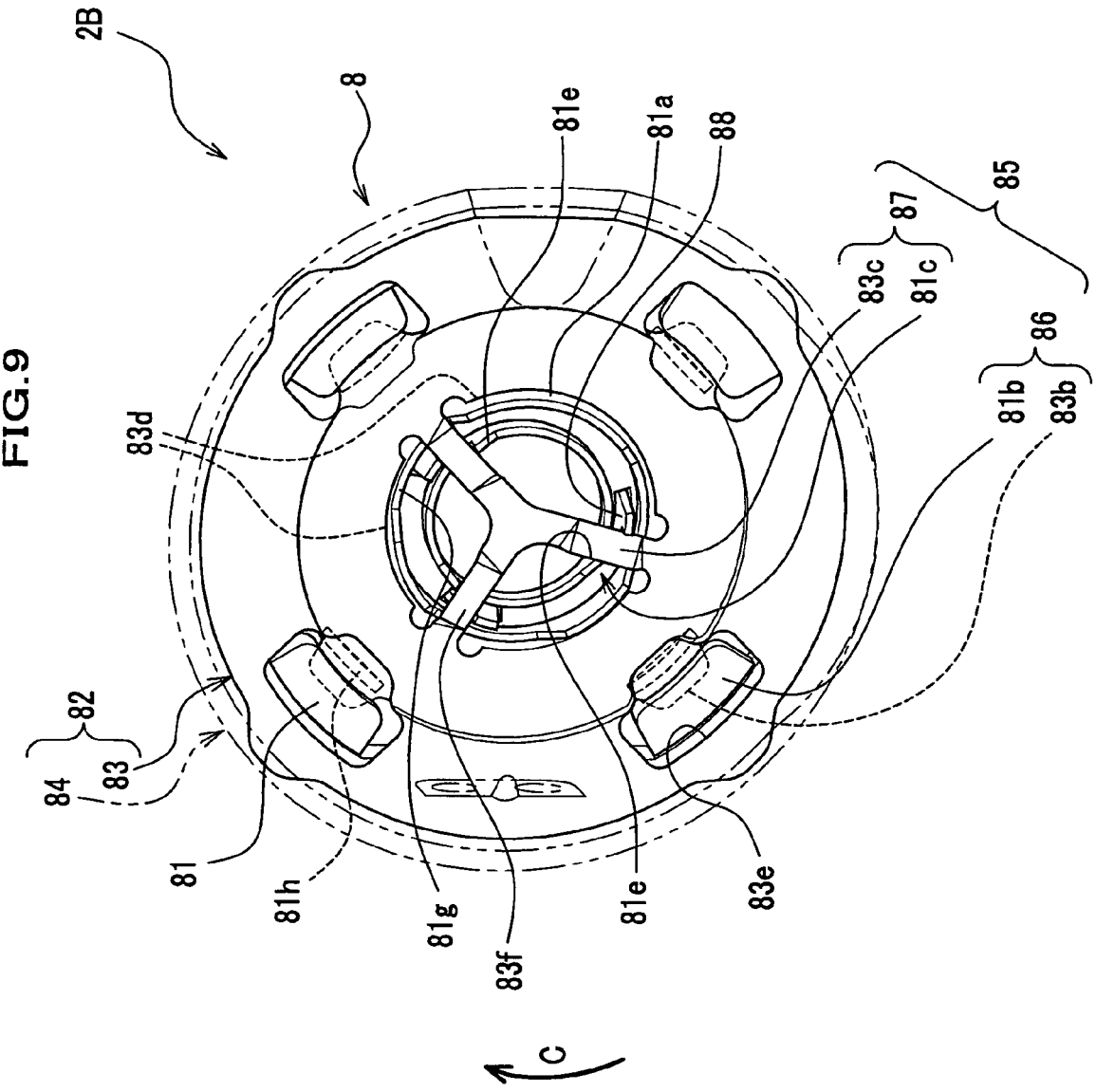
FIG. 9 is a perspective view showing essential parts of the structure of the fuel lid in the variation of the embodiment of present variation.

With reference to FIGS. 8 and 9, descriptions will be provided on a variation of the embodiment of the present invention.

FIG. 8 is an exploded perspective view of a structure of a fuel lid 2B in a variation of the second embodiment of the present invention. FIG. 9 is a perspective view of essential parts of a lid 8 of the fuel lid 2B in the variation of the second embodiment of the present invention.

The second engagement means 77 of the second embodiment of the present invention (see FIGS. 6 and 7) may be provided with stoppers 88, as shown in a second engagement means 87 of an engagement means 85 of the fuel lid 2B in FIG. 8. The stoppers 88 works such that, at the time of fixing a cover 82 onto a lid base 81 (see FIG. 9), each stopper 88 of the second engagement means 87 gets elastically deformed when the cover 82 is displaced relative to the lid base 81 in the direction of an arrow "B", and restricts the relative displacement of the cover 82 after the cover 82 is fixed onto the lid base 81.

It should be noted that the engagement means 85 includes a first engagement means 86 of an engaging and the second engagement means 87 as shown in FIGS. 8A and 8B.

(Structure of First Engagement Means)

The first engagement means 86 in FIGS. 8 and 9 includes first engaging portions 81b (also referred to as a "first engaging unit") projecting toward the center of the lid base 81, and first engaged pieces 83b (also referred to as a "first engaged unit") that are formed on a body 83 of the cover 82 and engaged with the first engaging portions 81b, similarly to the second embodiment.

In the vicinity of each first engaging portion 81b of the lid base 81, there is respectively provided a pressing projection 81h having a semi-arc shape in a cross sectional view, which serves for pressing the corresponding first engaged piece 83c of the body 83 of the cover 82 when the cover 82 is fixed onto the lid base 81.

On the outer circumferential side of the each first engaged piece 83b of the body 83 of the cover 82, there is provided a punched hole 83e. These punched holes 83e are produced when the first engaged pieces 83b are punched.

(Structure of Second Engagement Means)

The second engagement means 87 is provided on the lid base 81 and the cover 82 along the circumferential direction thereof, in such a manner that, when the cover 82 is slidedly turned to be displaced relative to lid base 81, second engaging portions 81c (also referred to as a "second engaging unit") formed on the lid base 81 engages with second engaged pieces 83c (also referred to as a "second engaged unit") of the cover 82.

Each second engaging portion 81c is constituted of steps 81e, restriction grooves 81g and the stoppers 88. The plural steps 81c are formed on an annular projection member 81d that is provided at an approximate center of the lid base 81, and each second engaged piece 83c abuts against the corresponding step 81e when the cover 82 is slidedly turned and displaced relative to the lid base 81. The restriction grooves 81g are formed on a first rib 81a that is provided with a distance on the outer circumferential side of the annular projection member 81d having the steps 81e thereon. The base end of each second engaged piece 83c abuts against the corresponding restriction grooves 81g when the second engaged piece 83c abuts against the step 81e. Each stopper 88 abuts against the corresponding second engaged piece 83c on a back face of the second engaged piece 83c when the second engaged piece 83c abuts against the corresponding step 81e and the restriction groove 81g.

As shown in FIG. 8B, each step 81e is constituted of an approximately right-angled rectangular shaped projection, and there is provided a dull slope face between each step 81e. The first rib 81a and the restriction groove 81g have approximately the same shape as that of the first rib 71a and the restriction groove 71e in the second embodiment of the present invention (see FIG. 6).

Each stopper 88 is an elastic piece formed by providing a C-letter shaped slit in a plane view therearound, thereby to elastically move in a vertical direction. The stopper 88 has a trapezoidal projection that projects toward the cover 82.

The second engaged pieces 83c are a variation of the second engaged pieces 73c of the second embodiment of the present invention, which is constituted by joining three engaged pieces similar to the engaged pieces 73c together into one at the center of the body 82, as shown in FIG. 9. Each second engaged piece 83c include a long and narrow piece that projectingly extends from the inner circumference on which three second ribs 83d are formed to the center of the cover 82. At the middle of the long and narrow piece, there is provided a tilt 83f that rises toward the turning direction defined by the arrow "C".

In this variation of the second embodiment, the finished cover 82 is placed on the lid base 81 such that each first engaged piece 83b is set between each first engaging portion 81b of the lid base 81, each second engaging piece 83c is set on the first rib 81a and the corresponding restriction groove 71e, and the second rib 73d is loosely engaged with the first rib 71a. Then, the body 83 of the cover 82 is slidedly turned (displaced) clockwise along the direction of the arrow "C" relative to the lid base 81.

As shown in FIG. 9, the base end of each first engaged piece 83b runs up on the pressing projection member 81h so that the first engaged piece 83b is firmly pressed at the back face thereof against the pressing projection member 81h, and the first engaged piece 83b slides into the corresponding first engaging portion 81b so as to be engaged therewith while being firmly pressed against the inner wall of the first engaging portion 81b.

On the other hand, each second engaged piece 83c is engaged with the corresponding second engaging portion 81c in such a manner that the base end of the second engaged piece 83c abuts against the corresponding step 81e, and the tilt 83f passing over the stopper 88 slides in between the stopper 88 and the step 81e. Since each second engaged piece 83c has the tilt 83f rising toward the turning direction and the stopper 88 has a vertical elasticity, it is possible to provide a firm engagement between the second engaged pieces 83c and the second engaging portions 81c by turning the cover 82 relative to the lid base 81.

Three engaged pieces 83c are jointed into one at the center of the cover 82, thereby to enhance the strength thereof. Therefore it is possible to ensure a firmer engagement between the second engaged pieces 83c and the second engaging portions 81c even if an external force is applied to the fuel lid 2B.

The second rib 83*d* provided on the inner circumferential edge of the cover 82 is engaged on the outer circumferential wall of the first rib 81*a*, whereby the first rib 81*a* and the second rib 83*d* come into contact.

In this way, the body 83 of the cover 82 is fixed to the lid base 81 through the first engagement means 86 and the second engagement means 87. The lid 8 is constituted into a single integrated part by assembling those three members that are the body 83 and the outer face 84 (constituting the cover 82) as well as the lid base 81 in the above described manner. Accordingly those members are firmly assembled into the lid 8 as a single part, without getting disassembled into members even if an outer force is applied to the lid 8.

As described above, in the embodiments of the present invention, it has chiefly been exemplified that the engagement means between the lid base and the cover of the lid is constituted by providing the engaging portion or portions on the lid base side and providing the engaged piece or pieces on the cover side. However, the present invention is not limited to this, and the engagement means may also be constituted by providing the engaging portion or portions on the cover side and providing the engaged piece or pieces on the lid base side, for example.

In the structure of the fuel lid according to the present invention, the lid and the cover that is placed in alignment with the side panel outer of the vehicle body are separately manufactured, so that the cover is coated with the same coating material in the same process together with the side panel outer of the vehicle body. Accordingly, the side panel outer and the cover are coated in the same color at the same time, resulting in solving difficulties such as differences in color or non-uniformity of coating of the vehicle body.

The embodiments according to the present invention have been explained as aforementioned. However, the embodiments of the present invention are not limited to those explanations, and those skilled in the art ascertain the essential characteristics of the present invention and can make the various modifications and variations to the present invention to adapt it to various usages and conditions without departing from the spirit and scope of the claims.

What is claimed is:

1. A fuel lid comprising:
    a case that is fixed to a body opening of a vehicle body for fueling and is connected with a fuel pipe; and
    a lid that is turnably attached to the case so as to open or close a case opening formed on the case for fueling, the lid comprising:
        a lid base having a hinge by which the lid base is pivotally supported on the case;
        a cover that covers an outer face of the lid base, and
            an engagement member including an engaging unit and an engaged unit provided between the lid base and the cover, wherein the lid base is provided with one unit of the engaging unit and the engaged unit and the cover is provided with the other unit, and through the engagement member, the lid base engaging with the cover by a relative displacement therebetween;
    wherein the one unit of the lid base is provided on a face thereof opposing the cover, the other unit of the cover is provided on a face thereof opposing the lid base, and wherein the fuel lid is configured and arranged such that the cover is capable of being displaced relative to the lid base by slidably turning the cover against the lid base, so that the lid base engages with the cover.

2. The fuel lid according to claim 1, wherein:
    the engagement member provided on each opposing face of the lid base and the cover along the circumferential direction thereof comprises a first engagement member and a second engagement member, wherein:
    the first engagement member includes a first engaging unit and a first engaged unit, one of which is provided on the face of the lid base opposing the cover, and the other of which is provided on the face of the cover opposing the lid base on each outer circumferential side thereof,
    the second engagement member includes a second engaging unit and a second engaged unit, one of which is provided on the face of the lid base opposing the cover, and the other of which is provided on the face of the cover opposing the lid base on each inner circumferential side of the first engagement member,
    and the second engagement member includes at least one stopper that deforms elastically when the cover is displaced relative to the lid base so as to engage the cover with the lid base, and restricts the relative displacing movement after the engagement therebetween.

3. The fuel lid according to claim 2, further comprising:
    a first rib projecting toward the cover on the face of the lid base on which the second unit is provided, and
    a second rib projecting toward the lid base on the face of the cover on which the other second unit is provided, wherein
    the first rib and the second rib contact each other when the cover is engaged with the lid base.

4. The fuel lid according to claim 1, wherein:
    the cover comprises a cover body that is attached to the lid base; and
    an outer face that is provided on the cover body so that a surface of the outer face of the cover appears similar to that of an outer side panel of the vehicle body,
    at least one flange is provided on part of an outer circumferential edge of the cover body,
    a hem is provided on an outer edge of the outer face of the cover, and the hem of the outer face of the cover is folded over the flange of the cover body so that the outer face of the cover is fixed to the cover body.

5. The fuel lid according to claim 4, wherein the hem provided on the outer edge of the outer face of the cover is formed to open relative to the cover body at a lower portion of the cover.

* * * * *